(12) United States Patent
Dworatzek et al.

(10) Patent No.: US 9,248,393 B2
(45) Date of Patent: Feb. 2, 2016

(54) CUP-SHAPED HOUSING, DEVICE FOR SEPARATING LIQUID FROM AIR, AND METHOD FOR MOUNTING THE CUP-SHAPED HOUSING ON A NIPPLE

(71) Applicant: MANN+HUMMEL GMBH, Ludwigsburg (DE)

(72) Inventors: Klemens Dworatzek, Edingen (DE); Bertram Bartelt, Steinheim (DE); Daniela Zinic, Speyer (DE)

(73) Assignee: MANN_HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/172,202

(22) Filed: Feb. 4, 2014

(65) Prior Publication Data

US 2015/0101293 A1 Apr. 16, 2015

(30) Foreign Application Priority Data

Feb. 4, 2013 (DE) .......................... 10 2013 001 842

(51) Int. Cl.
*B01D 46/24* (2006.01)
*B01D 46/00* (2006.01)

(52) U.S. Cl.
CPC ........ *B01D 46/0031* (2013.01); *B01D 46/0002* (2013.01); *B01D 46/24* (2013.01); *B01D 46/2403* (2013.01); *B01D 46/2411* (2013.01); *B01D 46/2414* (2013.01); *B01D 2201/02* (2013.01); *B01D 2201/304* (2013.01); *B01D 2201/34* (2013.01)

(58) Field of Classification Search
CPC ........... B01D 46/0002; B01D 46/0031; B01D 46/24; B01D 46/2411; B01D 27/08; B01D 2201/34; B01D 2201/304; B01D 46/2403; B01D 46/2414

See application file for complete search history.

(56) References Cited

U.S. PATENT DOCUMENTS

| 4,702,790 | A  | * | 10/1987 | Hogh et al. ................... | 156/293 |
| 5,928,513 | A  | * | 7/1999  | Bradford ....................... | 210/443 |
| 2007/0209992 | A1 | * | 9/2007  | Johnson et al. ............... | 210/232 |
| 2008/0295685 | A1 | * | 12/2008 | Uhland et al. .................... | 95/25 |
| 2010/0126928 | A1 | * | 5/2010  | South et al. ................... | 210/440 |
| 2012/0167534 | A1 | * | 7/2012  | Munkel et al. ............... | 55/385.3 |

FOREIGN PATENT DOCUMENTS

DE      10329401 A1    1/2005

* cited by examiner

*Primary Examiner* — Robert Clemente
(74) *Attorney, Agent, or Firm* — James Hasselbeck (57) ABSTRACT

A cup-shaped housing assembly for a device for separating liquid from air has a cup-shaped housing body having an interior. At least one annular filter element for separating liquid from air is arranged in the housing body. A housing cover closes off an end face of the housing body. The housing cover has an inner side that is facing the interior and an outer side that is facing away from the interior. The housing cover has at least one raw air inlet through which raw air is supplied to the interior. The housing cover has at least one clean air opening though which filtered clean air is discharged from the interior. For sealing the raw air inlet relative to the clean air opening, at least one sealing surface is arranged at the outer side of the housing cover across sections thereof.

19 Claims, 9 Drawing Sheets

CUP-SHAPED HOUSING, DEVICE FOR SEPARATING LIQUID FROM AIR, AND METHOD FOR MOUNTING THE CUP-SHAPED HOUSING ON A NIPPLE

CROSS-REFERENCE TO RELATED APPLICATION

This application claims the benefit of foreign priority to German patent application 10 2013 001 842.0 filed Feb. 4, 2013, the entire contents of the aforesaid German patent application being incorporated herein by reference.

BACKGROUND OF THE INVENTION

The invention concerns a cup-shaped housing assembly for a device for separating liquid from air, wherein the cup-shaped housing assembly is designed for receiving at least one filter element that is configured in particular as an annular coalescing element for separation of liquid from air and wherein the cup-shaped housing assembly for closing off its open end face has a housing cover, wherein the housing cover, for discharging the filtered clean air, has at least one clean air opening and wherein the housing cover has at least one raw air inlet for supply of raw air.

The present invention concerns moreover a device for separating liquid from air comprising a cup-shaped housing assembly with a filter element that is designed in particular as an annular coalescing element.

The present invention concerns also a method for mounting a cup-shaped housing assembly on a nipple for detachable connection of the cup-shaped housing assembly with a connecting head that is in particular connected to a compressed air compressor, wherein the cup-shaped housing assembly is detachably connected to the nipple, for example, screwed onto the nipple.

The publication DE 85 01 736.1 U1 discloses a device of the afore mentioned kind and this device is designed for separating oil droplets from air. The filter element or separating element is designed as an annular coalescing element that coalesces the fine oil droplets to larger droplets in the separating element and the larger droplets deposit downstream thereof in downward direction due to the force of gravity. A nipple which is designed as a threaded tubular socket is detachably connectable to a connecting head and a cup-shaped housing assembly in which the filter element is arranged. For discharging the clean air, the connecting head has a central pipe or cylindrical tubular element that projects through the nipple and opens into the filter element. The cylindrical tubular element embodied for separating the separated liquid from the purified air is thus correlated according to the prior art with the connecting head. The cylindrical tubular element extends through the nipple and projects past it. In the known device for separation of oil droplets from air, an annular gap is arranged between the cylindrical tubular element and the nipple for discharging the separated oil. This annular gap is connected with a separate discharge passage.

Moreover, for example, the publications EP 2 108 424 A1, EP 0 806 564 A1, and U.S. Pat. No. 6,972,092 B disclose air/oil separator boxes in which the removal of the separated oil is realized by means of an annular gap in the threaded tubular socket. According to the prior art, the separated oil is thus discharged via an annular gap that is surrounded by the nipple or the tubular socket, i.e., is arranged within the inner diameter of the nipple. This annular gap is formed by providing an additional tubular element that is inserted into the nipple and is arranged between the nipple and the additional tubular element.

The publication DE 88 06 694 U discloses a drain groove that is arranged within the thread of a drain plug. However, this known drain plug does not enable emptying in the completely screwed-in state but requires that the plug must be first unscrewed to some degree for emptying.

The object of the invention is to further develop a cup-shaped housing assembly of the aforementioned kind, a device for separating liquid from air of the aforementioned kind, as well as a method for mounting a cup-shaped housing assembly of the aforementioned kind in such a way that for discharging the filtered clean air as little energy as possible is required.

SUMMARY OF THE INVENTION

In accordance with the present invention, this is achieved in that for sealing between the raw air side and the clean air side, in particular for sealing the raw air inlet from the clean air opening, on the outer side of the housing cover which is facing away from the interior of the cup-shaped housing assembly at least over areas thereof at least one sealing surface is arranged.

This is further achieved by a device that is characterized in that the cup-shaped housing assembly is embodied as disclosed above.

This is further achieved in regard to the method in that the cup-shaped housing assembly is detachably connected to the nipple, for example, is screwed onto the nipple.

Accordingly, the invention resides in that, for sealing between the clean air side and the raw air side, in particular for sealing the raw air inlet from the clean air opening, on the outer side of the housing cover that is facing away from the interior of the cup-shaped housing assembly at least one sealing surface is provided at least across partial sections thereof. The cup-shaped housing assembly according to the invention and the device according to the invention thus have additionally a sealing surface on the outer side of the housing cover of the cup-shaped housing assembly.

This has the advantage that, in contrast to the prior art, the liquid drain for discharging the separated liquid from the interior of the cup-shaped housing assembly can be realized in the area of the clean air opening of the housing cover. Accordingly, an air/oil separator box can be provided that has a space-saving liquid drain. In contrast to the prior art, the liquid drain must not be located within the nipple which is connected to the cup-shaped housing assembly and no tubular element must be arranged within the nipple for providing the liquid drain.

At least one liquid drain is formed as at least one groove or at least one recess (passage, bore) in the housing cover that is arranged in radial direction between the at least one clean air opening at the housing cover and the at least one raw air inlet arranged off-center in the housing cover. The at least one sealing surface is arranged annularly and radially between the at least one raw air inlet and the at least one liquid drain at the housing cover such that the at least one sealing surface seals the at least one raw air inlet relative to the at least one liquid drain.

The cup-shaped housing assembly comprises a liquid collecting chamber at a clean air side of the filter element and the liquid drain is connected to or communicates with the liquid collecting chamber.

Advantageously, the clean air opening is configured for receiving a nipple which is extending through the housing cover in the direction of the longitudinal axis of the cup-shaped housing assembly. Moreover, for detachable connection of the housing cover with the nipple, the housing cover has advantageously in the area of the clean air opening at least one connecting section that is detachably connectable to the nipple wherein the sealing surface is arranged in such a way on the housing cover that in the connected state of the housing cover with the nipple the sealing surface is located between housing cover and nipple and seals the raw air inlet relative to the clean air opening. Alternatively, the sealing surface can be arranged in such a way on the housing cover that in the connected state of the housing cover with the nipple the sealing surface is located between housing cover and a connecting head which is connected to the nipple and seals the raw air inlet relative to the clean air opening.

For discharging the separated liquid from the interior of the cup-shaped housing assembly, in a particularly preferred embodiment of the present invention the nipple and/or the cup-shaped housing assembly, in particular the connecting section of the housing cover that is detachably connected to the nipple, are designed such that at least one liquid drain is arranged between the cup-shaped housing assembly, in particular the housing cover, and the nipple in the connected state of the cup-shaped housing assembly, in particular of the housing cover, with the nipple. The separated liquid can thus be discharged from the interior of the cup-shaped housing assembly in the connected state of the housing cover with the nipple without an additional tubular element having to be inserted into the nipple for this purpose. Accordingly, the inner diameter of the nipple is not narrowed by the inserted additional tubular element.

Instead, the nipple can have a cylinder-shaped tubular element adjoining the connecting section of the nipple which is detachably connectable to the cup-shaped housing assembly wherein the tubular element is designed for separation of the separated liquid from the purified air and forms a clean air outlet for discharging the filtered clean air from the cup-shaped housing assembly. In contrast to the prior art, the nipple itself can be designed as a clean air outlet and can have substantially the same inner diameter as the connecting section of the nipple that is detachably connectable to the cup-shaped housing assembly. In comparison to the prior art where the clean air inlet is formed by a tubular element inserted into the nipple, in the present invention the inner diameter for clean air outlet is substantially greater so that a reduced pressure differential results and less energy is required for discharging the filtered clean air.

Advantageously, the liquid drain extends in the direction of the longitudinal axis of the cup-shaped housing assembly, i.e., extends axially, from the inner side of the housing cover which is facing the interior of the cup-shaped housing assembly to the outer side of the housing cover which is facing away from the interior of the cup-shaped housing assembly. Advantageously, the liquid drain is arranged in radial direction between the usually centrally arranged clean air outlet and the raw air inlet that is arranged off-center. For example, the raw air inlet and/or the liquid drain can be formed by several openings or recesses which are arranged in a circular shape regularly or irregularly about the clean air outlet.

For detachably connecting the cup-shaped housing assembly with the nipple, the cup-shaped housing assembly and the nipple can be connected to each other by means of a screw connection or by means of a bayonet coupling. The connecting section of the housing cover that is detachably connectable to the nipple can be designed, for example, as an inner thread of the housing cover that, for detachably connecting to the cup-shaped housing assembly with the nipple, can be screwed onto an outer thread of the nipple. Advantageously, in this embodiment the connecting section of the nipple that is detachably connectable to the housing cover is thus designed as an outer thread.

The liquid drain can be formed by a groove which is arranged on the connecting section of the housing cover which is detachably connectable to the nipple, for example, in the inner thread of the housing cover, and/or on the connecting section of the nipple detachably connectable to the housing cover, for example, in the outer thread of the nipple.

In this context, the liquid drain can be a straight groove extending in the direction of the longitudinal axis of the cup-shaped housing assembly.

In order to provide a greater drain cross-section, several grooves described in the two preceding paragraphs can be arranged regularly or irregularly in a circular shape in circumferential direction.

Alternatively, the liquid drain can also be extending in a spiral shape from the inner side of the housing cover facing the interior of the cup-shaped housing assembly to the the outer side of the housing cover that is facing away from the interior of the cup-shaped housing assembly. For example, the liquid drain can be formed by an enlarged thread depth of the inner thread of the housing cover and/or by an enlarged thread depth of the outer thread of the nipple.

Alternatively, the liquid drain can be formed by at least one channel-like recess or bore in the housing cover that extends preferably axially and is further preferably radially positioned between the centrally arranged clean air opening in the housing cover and at least one off-center raw air inlet provided at the housing cover.

In a preferred embodiment, the sealing surface is arranged annularly between the raw air inlet and the liquid drain at the housing cover such that it seals the raw air inlet from the liquid drain. In this way, preferably two pressure levels are created, a first pressure level at the raw air side upstream of a filter element arranged in the cup-shaped housing assembly and a second pressure level downstream of the filter element at the clean air side, wherein the clear air outlet and the clean air opening and the liquid drain communicate with the clean air chamber and are therefore arranged at the pressure level of the clean air side.

For separating liquid from air, in the cup-shaped housing assembly at least one filter element in the form of an annular coalescing element is arranged that divides the interior of the cup-shaped housing assembly into a clean air chamber and a raw air chamber. The filter element can be an exchangeable filter element. Alternatively, the filter element in a service situation can be completely replaced together with the cup-shaped housing assembly. The filter element can be, for example, a filter element of a so-called spin-on filter. The filter element can comprise at least one filter medium. As a filter medium, glass fiber material, for example, multi-coiled glass fibers and/or nonwoven glass fibers, can be used.

In a preferred embodiment, the filter element has at an end that is facing the housing cover, in particular the end disk arranged thereat, a liquid collecting chamber that is connectable with the liquid drain. The separated liquid can be returned from the liquid collecting chamber through the liquid drain into the sump of the power machine, e.g. the compressor.

The filter element can also be used for liquids of any kind of a power machine, in particular a compressor, for example, a compressed air compressor, such as oil, fuel, hydraulic liquids or even cooling medium.

For supplying raw air into the cup-shaped housing assembly, the housing cover has at least one raw air inlet. This raw air inlet is preferably arranged off-center at the housing cover. Preferably, an outer sealing surface or seal is provided for sealing the raw air inlet relative to the environment. The sealing surface or seal is designed preferably as a sealing ring that can be compressed relative to the connecting head and that is arranged so as to surround the raw air inlet or inlets at the housing cover. The raw air inlet can extend in axial direction in a connecting head which is detachably connected to the nipple. The connecting head that is detachably connected to the nipple can be a separate connecting flange or can also be formed by a component of the compressed air compressor, for example, the compressor housing.

As disclosed above, the discharge of the clean air is done through the opening of the housing cover. The clean air outlet for discharging the filtered clean air from the cup-shaped housing assembly is preferably formed by the nipple. The nipple is preferably arranged centrally in the housing cover. The liquid drain is correlated with the clean air side of the device. For sealing between the raw air side and the clean air side, in particular for sealing the liquid drain relative to the raw air inlet, the housing cover is formed at the outer side which is facing away from the interior of the cup-shaped housing assembly at least partially as a sealing surface. Independent thereof or in conjunction therewith, for sealing between the raw air side and the clean air side of the device, on the outer side of the housing cover which is facing away from the interior of the cup-shaped housing assembly at least one sealing surface can be arranged at least across partial sections thereof.

According to an advantageous embodiment of the invention, the sealing surface can be formed by a surface area of the housing cover. In this case, the housing cover itself is formed on the outer side, which is facing away from the interior of the cup-shaped housing assembly, at least partially as a sealing surface. A sealing surface formed by the housing cover itself is advantageous because it cannot slide or be lost.

For example, the sealing surface can be formed by a metal surface of the housing cover. This has the advantage that the sealing surface is insensitive to temperature fluctuations and has a long service life. This sealing surface can interact with a metal surface of the nipple or a metal surface of a socket or a connecting head in such a way that a sealing action between the raw air side and the clean air side is provided. Thus, without an extra seal, a sealing action is possible in that two metal surfaces are brought into contact with each other so as to be seal-tight. In particular, the housing cover, for example, a threaded plate of the housing cover, can be resting seal-tightly on the nipple. In addition or as an alternative, the housing cover, for example, a threaded plate of the housing cover, can rest seal-tightly resting on the connecting head, for example, a filter head.

As an alternative to or in addition to the sealing surface which is provided in an area of the housing cover, the sealing surface can be formed by at least one seal that is arranged on the housing cover, for example, by a plastic seal. For attachment on the housing cover, the plastic seal can be attached by injection molding by means of an injection molding process to the housing cover and/or to the nipple. Alternatively, the sealing surface can be clipped onto, clamped onto, or glued onto the housing cover and/or onto the nipple.

For clipping or clamping onto the housing cover, the sealing surface can be a seal with at least one fixation element that extends in the direction of the longitudinal axis of the cup-shaped housing assembly. When the connecting section of the housing cover that is detachably connectable to the nipple is designed such that in the connected state of the housing cover with the nipple several liquid drains are arranged between housing cover and nipple for draining the separated liquid from the interior of the cup-shaped housing assembly, the fixation element can be designed such that it can be arranged on the housing cover in such a way that it extends through one of the liquid drains and in this way secures the seal on the housing cover.

The seal surface can be designed annularly or cylindrical, for example, can be in the form of an annular or cylindrical seal.

The sealing surface is advantageously designed for sealing between housing cover and nipple. The sealing surface or seal is located in axial direction seal-tightly on the nipple or a corresponding surface of the connecting head. For example, the sealing surface, in axial direction, can be arranged between the cup-shaped housing assembly and a projection of the nipple that extends radially, i.e., perpendicular to the longitudinal direction of the cup-shaped housing assembly and is, for example, a collar of the nipple. This radial projection is positioned advantageously with axial sealing action on the connecting head of the power machine when the nipple is connected to the connecting head. The liquid drain can extend in axial extension of the connecting section of the housing cover with the nipple through the collar of the nipple. The raw air inlet is preferably arranged on the exterior side of the collar which is facing away from the nipple. This raw air inlet can extend in axial direction into the connecting head of the power machine. For sealing between the raw air side and the clean air side, in this embodiment the sealing surface in the connected state of the cup-shaped housing assembly, in particular of the housing cover, with the nipple interacts with the collar of the nipple such that a sealing action between the raw air inlet and the liquid drain is realized.

BRIEF DESCRIPTION OF THE DRAWING

As already mentioned above, there are different possibilities for realizing and developing the teachings of the present invention in advantageous ways. The following description, claims, and drawings provide further details of the invention. Embodiments of the invention, features, and advantages of the present invention will be explained in the following with the aid of the Figures illustrating exemplary embodiments.

In the drawings, same or similar configurations, elements or features in FIGS. 1 through 9 are identified with identical reference characters.

DESCRIPTION OF THE PREFERRED EMBODIMENTS

Figure 1:
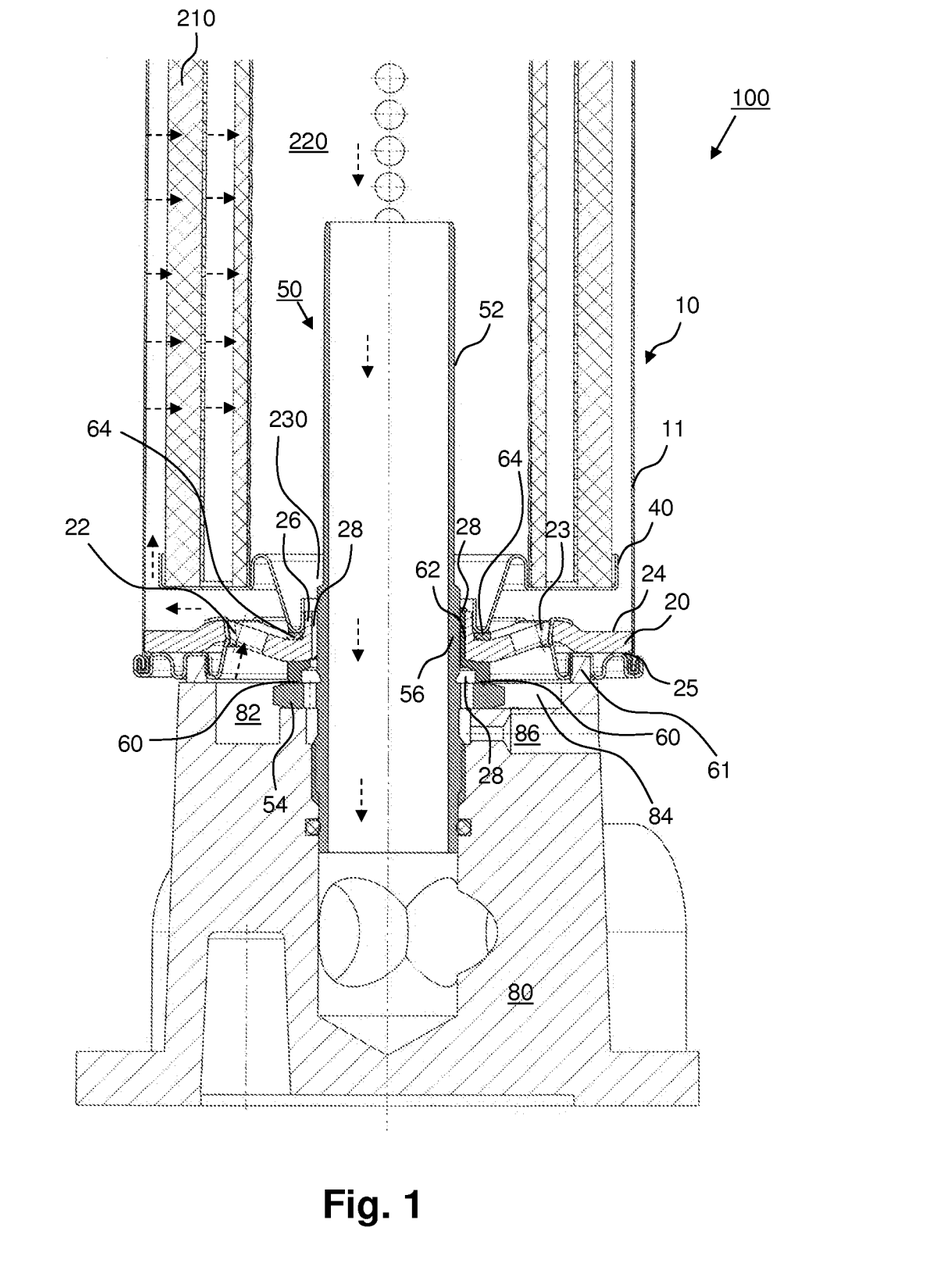
FIG. 1 shows in a schematic section illustration a first embodiment of a device according to the invention with a cup-shaped housing assembly according to the invention that is mounted in accordance with the method according to the invention.
Figure 2:
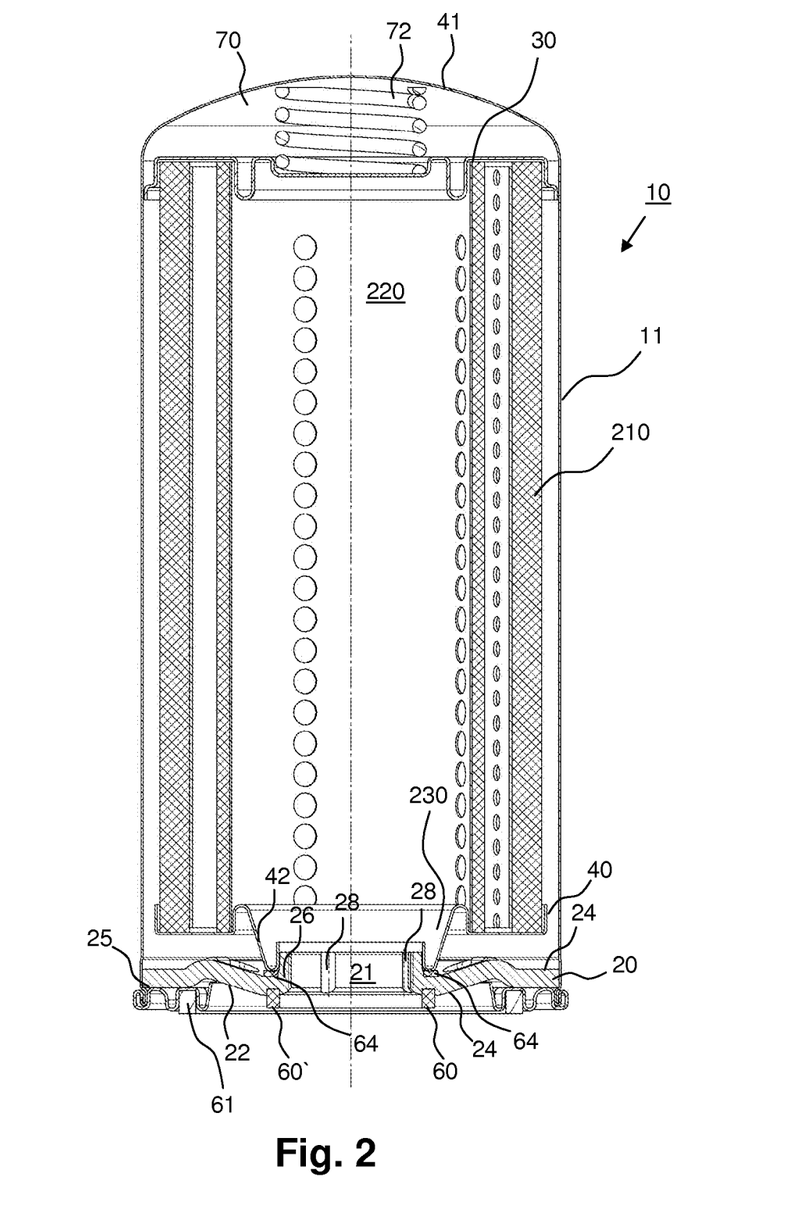
FIG. 2 shows in a schematic section illustration the cup-shaped housing assembly of the device of FIG. 1 in a second embodiment of a seal.
Figure 3:
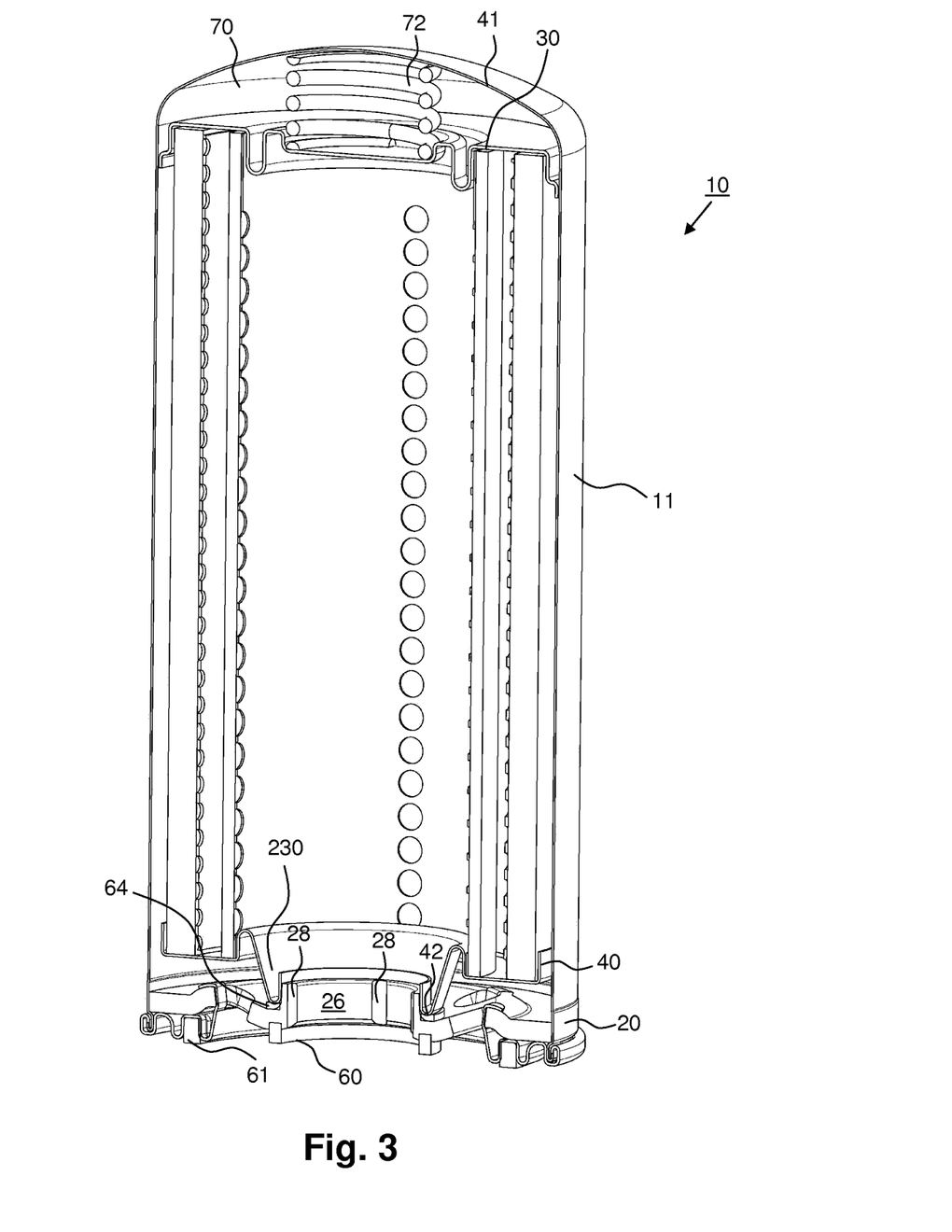
FIG. 3 shows in a perspective section illustration the cup-shaped housing assembly of the device of FIG. 2.
Figure 4:
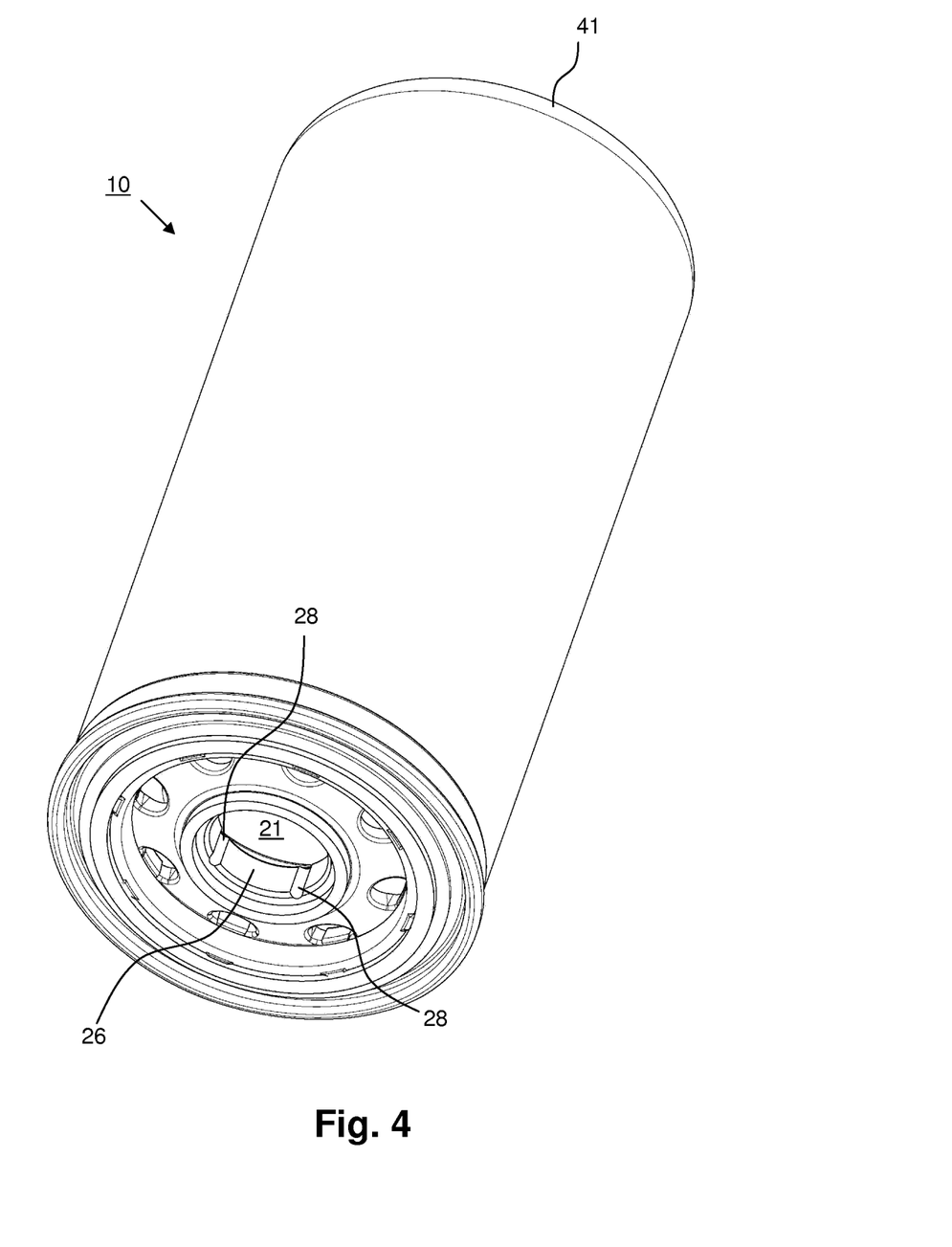
FIG. 4 illustrated in isometric illustration the cup-shaped housing assembly of the device of FIG. 1.
Figure 5:
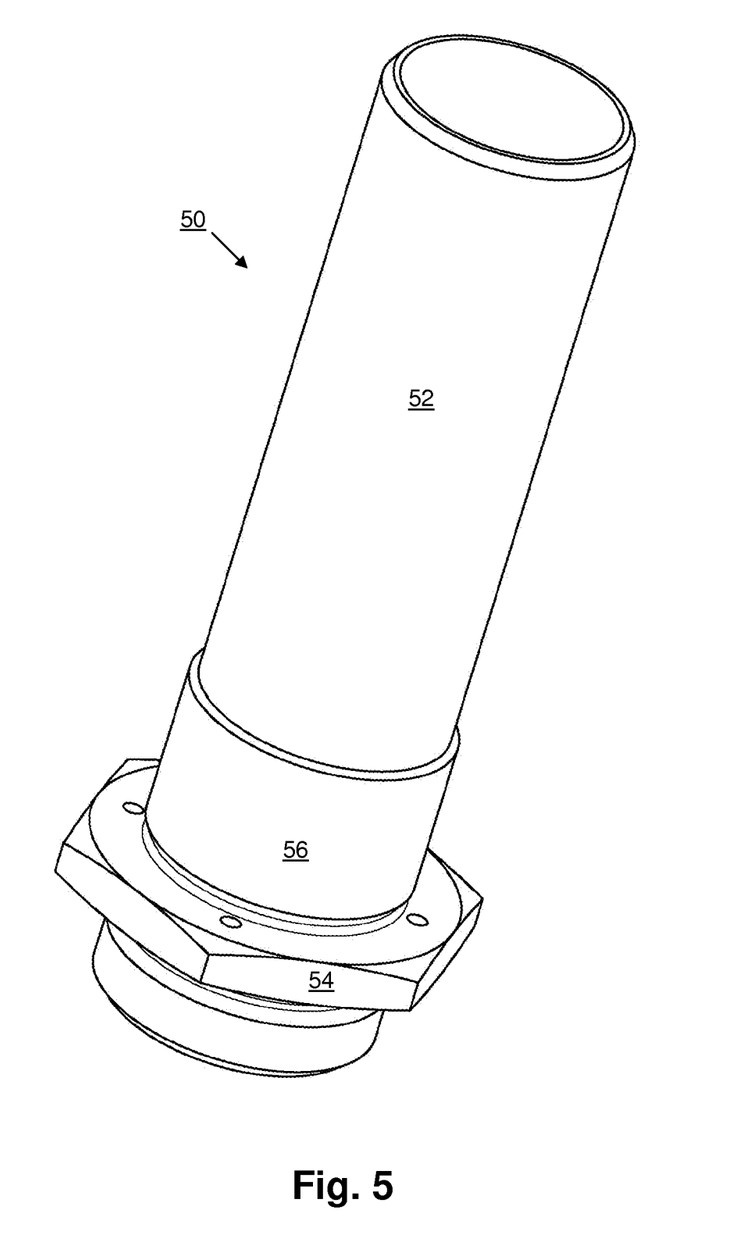
FIG. 5 is an isometric illustration of the nipple of the device of FIG. 1.
Figure 6:
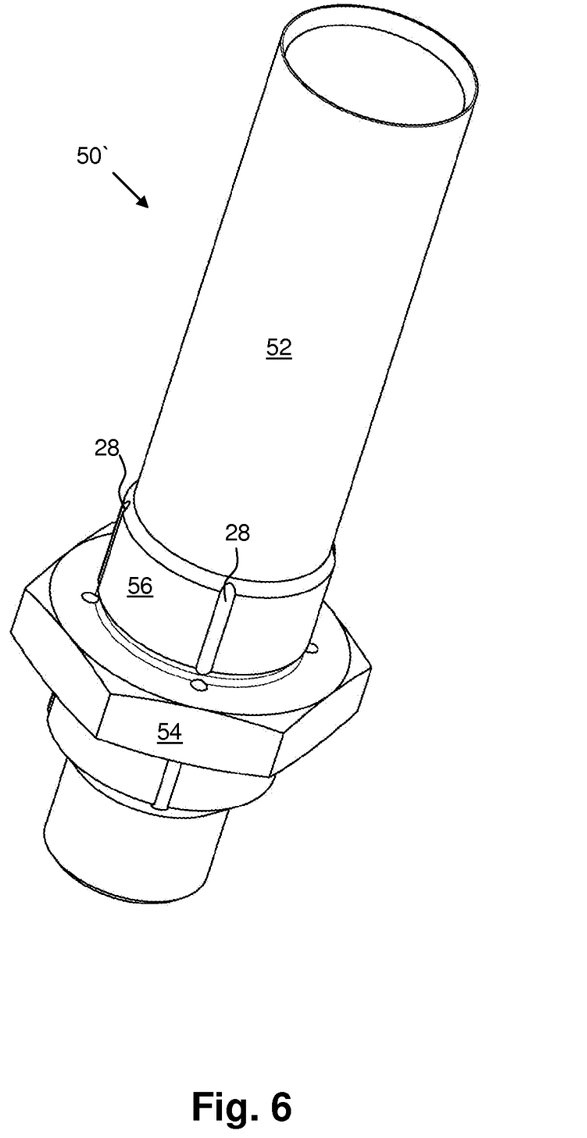
FIG. 6 is an isometric illustration of a second embodiment of the nipple for a device according to the invention.
Figure 7:
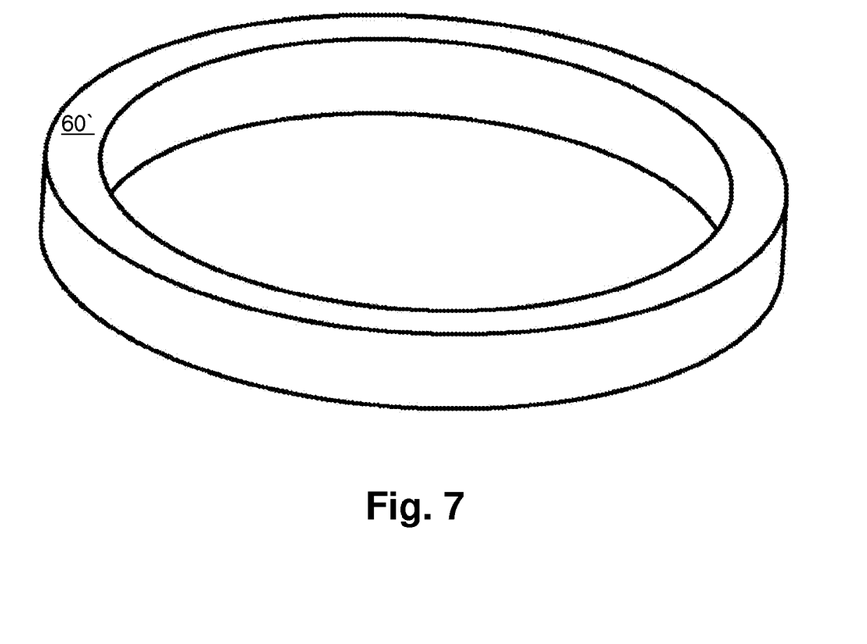
FIG. 7 is an isometric illustration of a detail view of the seal of the cup-shaped housing assembly of FIGS. 2 and 3.
Figure 8:
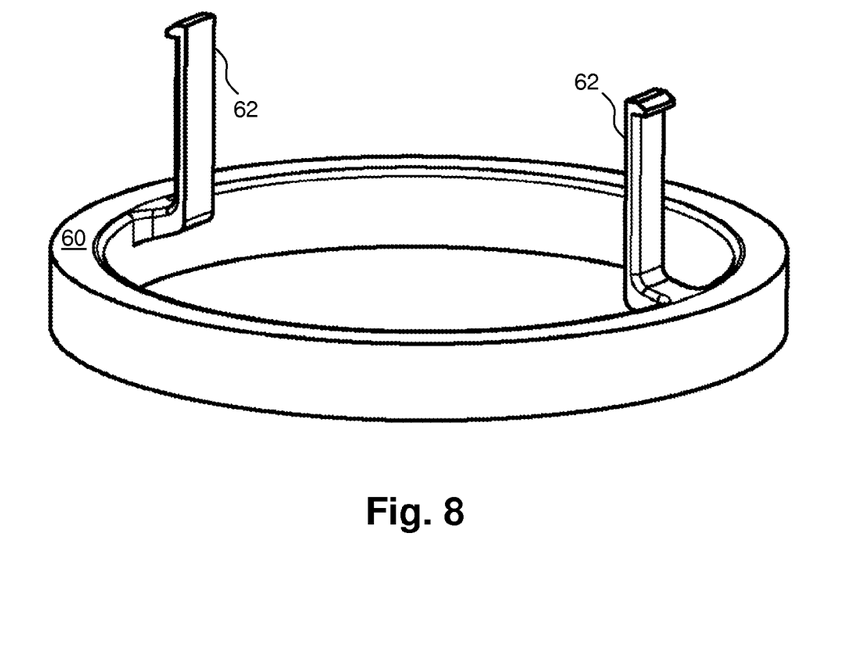
FIG. 8 is an isometric illustration of the seal of the device of FIG. 1.
Figure 9:
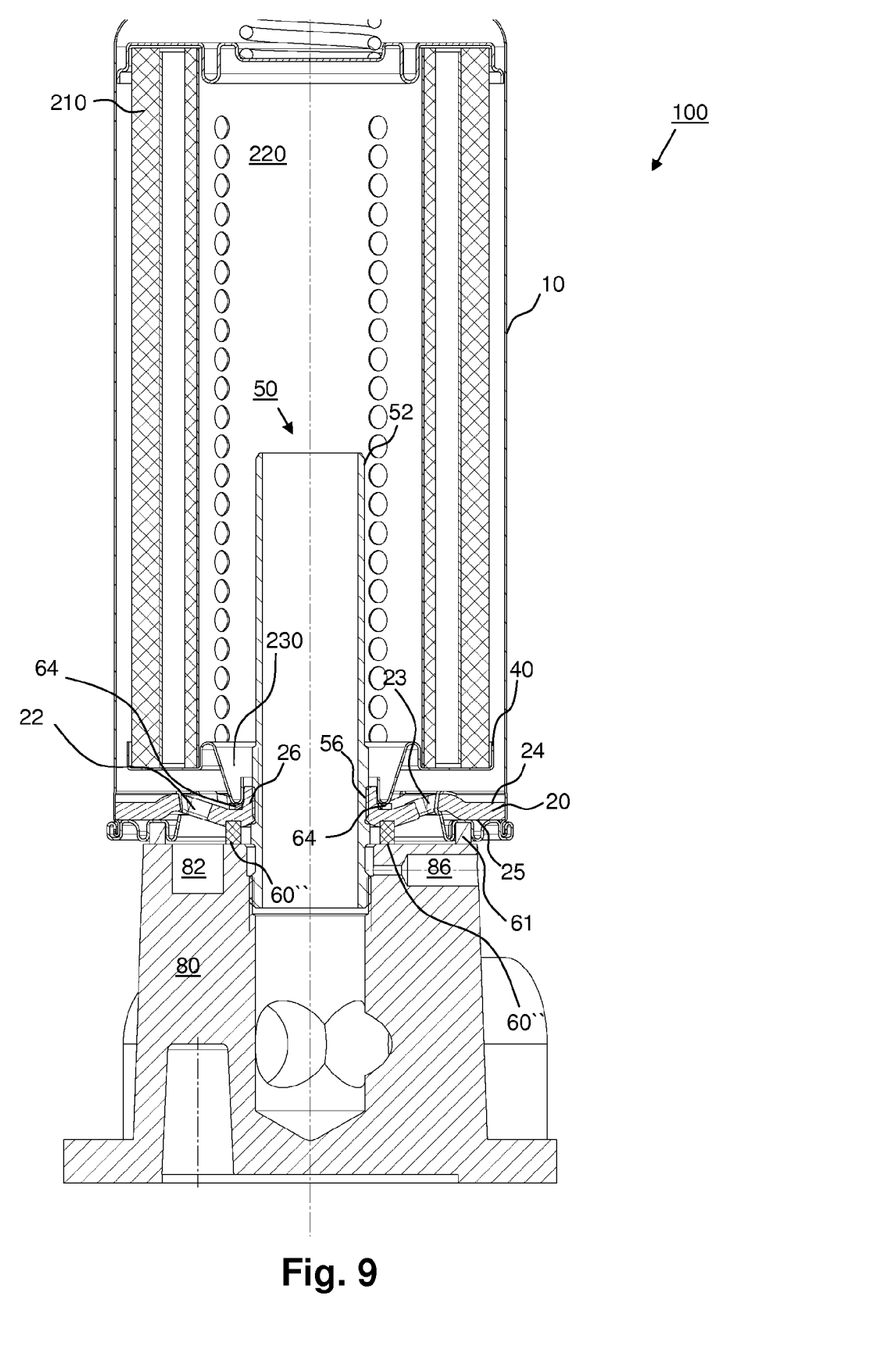
FIG. 9 is a schematic section illustration of the device of FIG. 1 with an embodiment of the seal.

In order to avoid unnecessary repetitions, the following explanations with regard to the configurations, features, and advantages of the invention (inasmuch as not indicated differently) refer to the first embodiment of a nipple illustrated in FIGS. 1 through 5 for a device according to the invention and to the second embodiment of the nipple illustrated in FIG. 6 for a device according to the invention as well as to the first embodiment of a seal illustrated in FIGS. 1 and 8 for a device according to the invention and the second embodiment of a seal illustrated in FIGS. 2, 3, and 7 for a device according to the invention and the third embodiment of a seal illustrated in FIG. 9 for a device according to the invention.

The reference characters that are employed herein and the elements to which they refer are explained briefly in the following:

Number 30 refers to a bottom-side end disk of the filter element.

Number 40 refers to an end disk at the opposite end face of the filter element.

Number 41 refers to the closed housing bottom of the cup-shaped housing body 11 of the housing assembly 10.

Number 42 is an annular projection of the end disk 40.

Number 50 indicates a nipple for detachable connection of the cup-shaped housing assembly 10 with a connecting head 80 of a power machine, in particular a compressor, for example, a compressed air compressor. In particular, the nipple 50 is an axial screw-on nipple, for example, a tubular socket, for example, a threaded tubular socket (first embodiment, see FIGS. 1 and 5).

Number 50' is a nipple for detachable connection of the cup-shaped housing assembly 10 with a connecting head 80 of a power machine. It is in particular an axial screw-on nipple, for example, a tubular socket, for example, a threaded tubular socket (second embodiment, see FIG. 6).

Number 52 is a clean air outlet of the nipple 50 or 50' for discharging the clean air from the cup-shaped housing assembly 10, in particular a central passage for discharging the clean air.

Number 54 is a radial projection, in particular collar, of the nipple 50 or 50'.

Number 56 is a connecting section of the nipple that is detachably connectable to the cup-shaped housing assembly 10, in particular with the housing cover 20; connecting section 56 is, for example, an outer thread of the nipple 50 or 50'.

Number 60 is a sealing surface, in particular a seal, for example, an annular seal (first embodiment, see FIGS. 1 and 8), arranged at the outer side 26 of the housing cover 20 that is facing away from the interior 70 of the cup-shaped housing assembly 10.

Number 60' refers to a sealing surface, in particular a seal, for example, an annular seal (second embodiment, see FIGS. 2, 3, 7).

Number 60" refers to a sealing surface, in particular a seal, for example, annular seal (third embodiment, FIG. 9)

Number 61 is the outer sealing surface, in particular a seal, for example, annular second seal (all embodiments) for sealing the raw air side or the raw air inlet relative to the environment.

Number 62 is a fixation element, for example, a fixation nose, extending in the direction of the longitudinal axis of the cup-shaped housing assembly 10 for clamping the sealing surface 60 on the housing cover 20.

Number 64 indicates a seal for sealing between liquid drain 28 and raw air inlet 22, the seal being arranged at the inner side 24 of the housing cover 20 which is facing the interior 70 of the cup-shaped housing assembly 10.

Number 70 refers to the interior of the cup-shaped housing assembly 10.

Number 72 is a spring, for example, a coil pressure spring.

Number 80 refers to a connecting head, in particular a receiving head or a separator head or receiving flange, for connecting the device 100 to a component of a power machine, in particular a compressor, for example, a compressed air compressor.

Number 82 refers to a first raw air inlet of the connecting head 80 that is in particular a first passage that is off-center and in particular provided for inflow of raw air.

Number 84 refers to a further raw air inlet of the connecting head 80 that is in particular an off-center passage for supply of raw air Number 86 is a drain passage of the connecting head 80 for draining the separated liquid.

Number 100 is a device, in particular a filter system, for separating liquid and air, in particular an aerosol which is formed of liquid, wherein the liquid is for example oil, fuel, hydraulic liquid, or cooling medium.

Number 210 is a first filter medium of the filter element which is formed as an annular coalescing element and which is in particular a glass fiber material of a multi-coiled configuration.

Number 220 refers to a further filter medium of the filter element configured as an annular coalescing element, the further filter medium being in particular a nonwoven.

Number 230 refers to the liquid collecting chamber in the interior of the filter element.

Number 280 is a liquid drain that is arranged between the housing cover 20 and the nipple 50 or 50' and that is embodied as at least one through bore of the housing cover 20.

In the first embodiment of the invention illustrated in FIGS. 1 through 6, a device 100, for example, an oil separator or a fuel filter, for separating liquid from air is illustrated. The device 100 has a cup-shaped housing assembly 10 wherein the basic member of the cup-shaped housing assembly 10 is preferably a cup-shaped housing body or housing cup 11. The cup-shaped housing body or housing cup 11 has a housing bottom 41 and an open end face. A filter element is arranged in the interior of the housing assembly 10, or its housing body 11, wherein the filter element is, for example, a so-called spin-on filter, and is embodied as an annular coalescing element. As a filter medium, the filter element comprises glass fiber material 210 that is configured in a multi-coiled annular arrangement and delimited by two end disks 30, 40. As a further filter medium, in the interior of the glass fiber coil 210 a nonwoven 220 is arranged.

For closing its open end face, the cup-shaped housing assembly 10 has a housing cover 20. This housing cover 20 has an opening 21 (see FIG. 4) for discharging the filtered clean air. This opening 21 is arranged centrally in the housing cover 20. The area of the housing cover 20 that surrounds the opening 21 is substantially cylindrical, in particular of a circular cylinder shape, for example, designed as an annular collar of the housing cover.

The opening 21 receives the nipple 50 which extends through the housing cover 20 in the direction of the longitudinal axis of the cup-shaped housing assembly 10 and of the housing body 11. The housing cover 20 is detachably connectable to the nipple 50.

The connecting section 26 of the housing cover 20 that is detachably connectable to the nipple 50 is designed such that, in the connected state of the housing cover 20 with the nipple 50, at least one liquid drain 28, for example, an oil passage or a connecting passage, is disposed between housing cover 20 and nipple 50 for draining the separated liquid from the interior 70 of the cup-shaped housing assembly 10.

As illustrated in FIGS. 1 through 5, the liquid drain 28 can be formed by at least one groove or channel-like recess 28 of the connecting section 26 of the housing cover 20 that is connectable to the nipple 50 and that is, for example, an inner thread of the housing cover 20. The groove or recess 28 extends in axial direction from the inner side 24 of the housing cover 20 that is facing the interior 70 of the cup-shaped housing assembly 10 to the outer side 25 of the housing cover 20 which is facing away from the interior 70 of the cup-shaped housing assembly 10.

As an alternative to the groove 28 in the connecting section 26 of the housing cover 20 that is connectable to the nipple 50, or as a supplement to the groove 28 in the connecting section 26 of the housing cover 20 that is connectable to the nipple 50, as shown in FIG. 6, the liquid drain 28 can be formed by at least one groove or channel-like recess 28 in a section 56 of the nipple 50' so as to extend in axial direction from an inner area of the nipple 50' facing the interior 70 of the cup-shaped housing assembly 10 to an outer area of the nipple 50' that is facing away from the interior 70 of the cup-shaped housing assembly 10. This groove 28 which is arranged on the nipple 50' can be, for example, provided on the outer thread of the nipple 50'.

Figure 10:
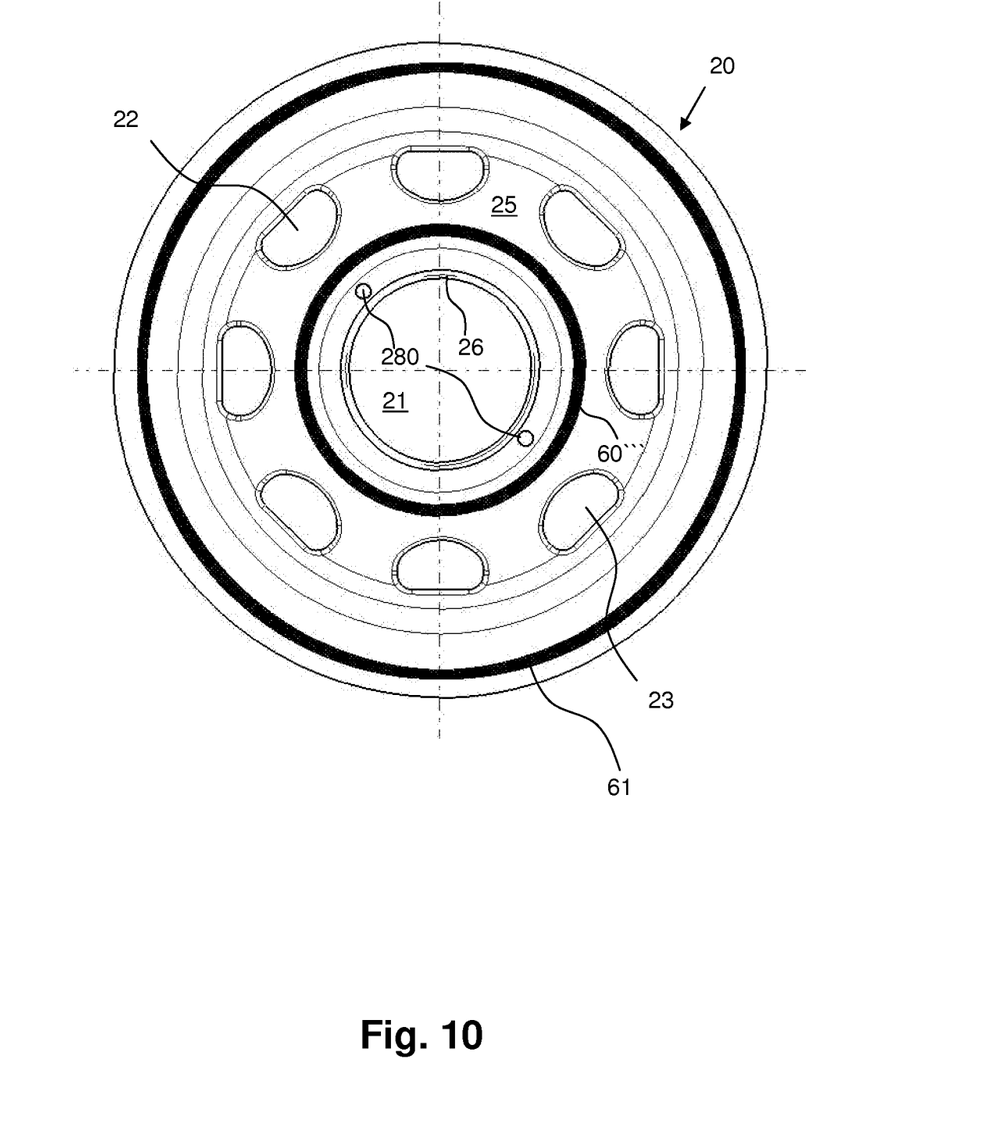
FIG. 10 shows a plan view of an alternative embodiment of the housing cover of the cup-shaped housing assembly of FIG. 3.

As an alternative, as shown in FIG. 10, the liquid drain can be formed by at least one through bore 280 that extends through the housing cover 20 in axial direction from the inner side 24 of the housing cover 20 facing the interior 70 of the cup-shaped housing assembly 10 to the outer side 25 of the housing cover 20 facing away from the interior 70 of the cup-shaped housing assembly 10.

Thus, the liquid drain 28 can be, for example, formed by a drainage groove which is arranged in the thread (not illustrated) of the housing cover 20 and/or in the thread (not illustrated) of the nipple 50'.

As an alternative to a screw connection, the nipple 50, 50' can also be connected by means of a bayonet coupling with the housing cover 20.

The liquid drain 28 enables between nipple and housing cover a permanent drainage or emptying in the completely connected state, for example, screwed-on state, of nipple 50, 50' and housing cover 20.

The liquid drain 28 is correlated with the clean air side of the cup-shaped housing assembly 10. The liquid collects in the collecting chamber 230 that is embodied preferably as a depression in the open end disk 40 of the filter element 210, 220 and is formed at least partially by the annular projection 42.

For draining the separated liquid, the drain 28 is connected with a drainage channel 86 of the connecting head 80.

For supply of raw air to the cup-shaped housing assembly 10, the housing cover 20 has at least one raw air inlet 22, 23 which is arranged off-center. The flow of the air is indicated in FIG. 1 by means of arrows in dashed lines. To avoid crowding of the drawing, the arrows are only shown in the left half of the drawing. For sealing the raw air side relative to the environment, a seal 61 is provided that can be contacted and compressed in axial direction relative to the connecting head or socket 80. The seal 61 is usually an annular seal and is attached to the housing cover 20.

At a spacing to the housing cover 20 a collar 54 extending in radial direction is provided on the nipple 50, 50'. Between housing cover 20 and collar 54, a seal 60 is provided that seals the raw air inlet 22, 23 relative to the liquid drain 28.

As an alternative, as illustrated in FIG. 9, the sealing action can also be realized directly between the housing cover 20 and the connecting head or socket 80. In order to seal the raw air inlet 22, 23 relative to the liquid drain 28, the seal 60''' can thus also be positioned between housing cover 20 and connecting head 80. As illustrated in FIG. 9, the nipple 50 can also be formed without radial collar.

The seal 60, as illustrated in FIG. 1, can be provided with a fixation nose that extends in the direction of the longitudinal axis of the cup-shaped housing assembly 10 for clamping the sealing surface 60 on the housing cover 20. In this context, the fixation nose 62 is arranged in a liquid drain 28.

Alternatively, as illustrated in FIGS. 2, 3, 7, and 9, the seal 60 can also be a conventional annular seal.

In addition to the sealing surface 60 arranged at the outer side 26 of the housing cover 20 that is facing away from the interior 70 of the cup-shaped housing assembly 10, the cup-shaped housing assembly 10, for sealing between the liquid drain 28 and the raw air inlet 22, has also at least one seal 64 which is arranged on the inner side 24 of the housing cover 20 which is facing the interior 70 of the cup-shaped housing assembly 10. This further seal 64 in the illustrated embodiment is arranged between an annular projection 42 of an end disk 40 at an end face of the cup-shaped housing assembly 10 and the inner side 24 of the housing cover 20.

For discharging the clean air from the cup-shaped housing assembly 10, the nipple 50 or 50' has a central clean air outlet 52 which is monolithically formed with the nipple 50 or 50' (see FIGS. 1, 5, 6). The clean air outlet 52 extends into the filter element 210, 220 in particular approximately to the center of the filter element 210, 220.

On the side of the nipple which is facing away from the cup-shaped housing assembly 10, the nipple is detachably connectable with a connecting head 80 for connecting the device 100 to a component of a power machine.

In contrast to the prior art, the nipple 50 or 50' is therefore formed only of a single part instead of, as is conventional, being comprised of the nipple body and an inserted additional tube for providing an annular gap as a liquid drain. In contrast to the prior art, in the embodiment of the invention illustrated in FIGS. 1 to 9 there is no sealing seat and no O-ring within the corresponding spin-on filter. In this way, a further cost advantage is provided. In order to still have a sealing action between the drain and the raw side, an additional sealing surface 60, 60', 60'' is provided, for example, a plastic seal.

While specific embodiments of the invention have been shown and described in detail to illustrate the inventive principles, it will be understood that the invention may be embodied otherwise without departing from such principles.

What is claimed is:

1. A cup-shaped housing assembly for a device for separating liquid from air, wherein the cup-shaped housing assembly comprises:
   a cup-shaped housing body having an interior and adapted to receive at least one annular filter element for separating liquid from air;

a housing cover that closes off an end face of the housing body, wherein the housing cover has an inner side that is facing the interior and an outer side that is facing away from the interior;

wherein the housing cover has at least one raw air inlet through which raw air is supplied to the interior;

wherein the housing cover has at least one clean air opening though which filtered clean air is discharged from the interior;

wherein, for sealing the raw air inlet relative to the clean air opening, at least one sealing surface is arranged at the outer side of the housing cover at least across sections thereof;

wherein the at least one clean air opening is adapted to receive a nipple connectable to a connecting head of a power machine, the nipple extending in a direction of a longitudinal axis of the cup-shaped housing assembly through the housing cover;

the housing cover, in the area of the at least one clean air opening, is detachably connected with the nipple;

the at least one sealing surface is arranged such on the housing cover that, when the housing cover and the nipple are connected to each other in a connected state, the at least one sealing surface is arranged between the housing cover and the nipple or between the housing cover and the connecting head connected to the nipple and seals the at least one raw air inlet relative to the at least one clean air opening;

wherein the housing cover has a connecting section interacting with a connecting section of the nipple so as to detachably connect the housing cover and the nipple;

wherein the connecting sections of the housing cover and of the nipple are configured such that, in the connected state, between the housing cover and the nipple at least one liquid drain is arranged that drains separated liquid from the interior;

wherein the connecting section of the housing cover is configured such that, in the connected state, between the housing cover and the nipple several of the at least one liquid drain are arranged, wherein the at least one sealing surface is a seal provided with at least one fixation element extending in the direction of the longitudinal axis;

wherein the fixation element secures the seal on the housing cover;

wherein the fixation element is arranged on the housing cover such that the fixation element extends through one of the several liquid drains.

2. The cup-shaped housing assembly according to claim 1, wherein
the at least one sealing surface is embodied by a surface of the housing cover.

3. The cup-shaped housing assembly according to claim 1, wherein
the at least one sealing surface is in the form of at least one seal arranged on the housing cover.

4. The cup-shaped housing assembly according to claim 3, wherein
the at least one seal is a sealing ring that surrounds the clean air opening.

5. The cup-shaped housing assembly according to claim 1, wherein
the at least one sealing surface is configured such that, in the connected state, the at least one sealing surface interacts with a radial projection of the nipple or with a sealing surface of the connecting head such that the at least one clean air opening is sealed relative to the at least one raw air inlet.

6. The cup-shaped housing assembly according to claim 1, wherein
the at least one liquid drain is arranged at a clean air side of the cup-shaped housing assembly and
wherein the at least one sealing surface is arranged on the housing cover such that the at least one sealing surface seals the at least one raw air inlet relative to the liquid drain.

7. The cup-shaped housing assembly according to claim 1, wherein the at least one liquid drain extends in the direction of the longitudinal axis from the inner side of the housing cover to the outer side of the housing cover.

8. The cup-shaped housing assembly according to claim 7, wherein
the at least one liquid drain is formed by at least one groove or at least one channel-shaped recess which is provided on the connecting section of the housing cover and/or on the connecting section of the nipple.

9. The cup-shaped housing assembly according to claim 1, wherein
the at least one liquid drain extends spirally from the inner side of the housing cover to the outer side of the housing cover.

10. The cup-shaped housing assembly according to claim 1, wherein
the connecting section of the housing cover is an inner thread of the housing cover and
wherein the connecting section of the nipple is an outer thread of the nipple, wherein the inner thread is screwed onto the outer thread.

11. The cup-shaped housing assembly according to claim 1, wherein
the at least one clean air opening is centrally arranged in the housing cover and the at least one raw air inlet is arranged off center in the housing cover.

12. The cup shaped housing assembly according to claim 11, wherein
the at least one liquid drain is at least one groove or at least one recess in the housing cover that is arranged in radial direction between the at least one clean air opening at the housing cover and the at least one raw air inlet arranged off-center in the housing cover,
wherein the at least one sealing surface is arranged annularly and radially between the at least one raw air inlet and the at least one liquid drain at the housing cover such that the at least one sealing surface seals the at least one raw air inlet relative to the at least one liquid drain.

13. A method for mounting a cup-shaped housing assembly according to claim 1 detachably on a connecting head of a power machine, the method comprising:
detachably connecting the cup-shaped housing assembly to a nipple that is connectable to the connecting head.

14. The method according to claim 13, comprising
screwing the cup-shaped housing assembly onto the nipple.

15. A device for separating liquid from air, comprising
a cup-shaped housing assembly and including:
a cup-shaped housing body having an interior and adapted to receive at least one annular filter element for separating liquid from air;
a housing cover that closes off an end face of the housing body, wherein the housing cover has an inner side that is facing the interior and an outer side that is facing away from the interior;
wherein the housing cover has at least one raw air inlet through which raw air is supplied to the interior;

wherein the housing cover has at least one clean air opening though which filtered clean air is discharged from the interior; and wherein, for sealing the raw air inlet relative to the clean air opening, at least one sealing surface is arranged at the outer side of the housing cover at least across sections thereof;

at least one annular filter element disposed in the cup-shaped housing assembly;

wherein the cup-shaped housing assembly comprises a liquid collecting chamber at a clean air side of the filter element and a liquid drain connected to the liquid collecting chamber;

a nipple which is detachably connected with a connecting head of a power machine and with the cup-shaped housing assembly;

wherein the nipple and/or the cup-shaped housing assembly are designed such that, when the cup-shaped housing assembly and the nipple are connected in a connected state, the liquid drain is formed between the cup-shaped housing assembly and the nipple.

16. The device according to claim 15, wherein the nipple comprises a cylindrical tubular element designed for separating separated liquid from filtered clean air, wherein the cylindrical tubular element is monolithically formed together with the nipple and projects into the filter element, wherein the cylindrical tubular element forms a clean air outlet for discharging the filtered clean air from the cup-shaped housing assembly.

17. The device according to claim 16, wherein the nipple has a connecting section adapted to connect the nipple to the housing cover of the cup-shaped housing assembly, wherein the clean air outlet adjoins the connecting section and/or has an inner diameter that is identical to an inner diameter of the connecting section of the nipple.

18. The device according to claim 15, wherein the liquid drain is adapted to discharge in the connected state the separated liquid from the liquid collecting chamber to the connecting head.

19. The device according to claim 15, wherein the at least one raw air inlet of the cup-shaped housing assembly is arranged off-center on the cup-shaped housing assembly, wherein the nipple is centrally arranged on the cup-shaped housing assembly, and wherein the at least one sealing surface at the housing cover of the cup-shaped housing assembly is an axial sealing surface and is arranged between the housing cover and a radially extending projection of the nipple and/or an area of the connecting head such that the at least one sealing surface seals the liquid drain relative to the at least one raw air inlet.

* * * * *